(12) United States Patent
Chandika et al.

(10) Patent No.: US 8,107,370 B2
(45) Date of Patent: Jan. 31, 2012

(54) NETWORK ACCESS DEVICE WITH RESTRICTED AND UNRESTRICTED INPUT PORTS

(75) Inventors: Nagarani Chandika, Sunnyvale, CA (US); Hugh Holbrook, San Francisco, CA (US); Adam Sweeney, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1467 days.

(21) Appl. No.: 11/100,879

(22) Filed: Apr. 6, 2005

(65) Prior Publication Data

US 2006/0227797 A1 Oct. 12, 2006

(51) Int. Cl.
*H04L 12/26* (2006.01)
(52) U.S. Cl. ............... 370/230.1; 370/252; 370/255; 370/463
(58) Field of Classification Search ....... 370/299–230.1, 370/241–246, 252, 254, 255, 256, 445, 446, 370/463; 726/11–14; 340/5.2, 5.74; 709/238
See application file for complete search history.

(56) References Cited

U.S. PATENT DOCUMENTS

| | | | | |
|---|---|---|---|---|
| 5,124,984 A * | 6/1992 | Engel | .................... | 370/230 |
| 5,485,455 A * | 1/1996 | Dobbins et al. | ............... | 370/255 |
| 5,537,099 A * | 7/1996 | Liang | .................... | 340/5.74 |
| 5,822,303 A * | 10/1998 | Carter et al. | .................. | 370/246 |
| 5,878,078 A * | 3/1999 | Griffin et al. | .................. | 375/222 |
| 5,896,499 A * | 4/1999 | McKelvey | ...................... | 726/11 |
| 6,510,151 B1 * | 1/2003 | Cioli et al. | ..................... | 370/352 |
| 6,680,917 B1 * | 1/2004 | Seaman | ........................ | 370/256 |
| 7,299,296 B1 * | 11/2007 | Lo et al. | ........................ | 709/238 |
| 2002/0110122 A1 * | 8/2002 | Ramfelt et al. | ............... | 370/389 |
| 2004/0062267 A1 * | 4/2004 | Minami et al. | ................ | 370/463 |
| 2006/0083177 A1 * | 4/2006 | Iyer et al. | ....................... | 370/252 |

OTHER PUBLICATIONS

Cisco Systems, Inc., "CiscoWorks Access Control List Manager 1.4", Copyright © 2002, 14 pages.
Cisco Systems, Inc., "Understanding and Configuring DHCP Snooping", Chapter 17, Cisco IOS Software Configuration Guide -Release 12.1(12c)EW, obtained at http://www.cisco.com/en/US/docs/switches/lan/catalyst4500/12.1/12ew/configuration/guide/config.html, 1992-2009; 4 pages.

* cited by examiner

*Primary Examiner* — Andrew Lai
(74) *Attorney, Agent, or Firm* — Fish & Richardson P.C.

(57) ABSTRACT

Access devices and methods according to the invention interconnect digital devices and a network. Setting a parameter associated with each input port of an access device specifies whether the device connected with that port is restricted or unrestricted. When a particular input port is restricted, packet detectors examine the packets received on that port. In some embodiments, an exception handler handles restricted packets from restricted devices in an advantageously flexible manner. In other embodiments, a controller receives a configuration command and sets the restriction parameters accordingly. The invention provides a simple, abstract, easy to use, and flexible tool for network management, configuration, and reconfiguration.

21 Claims, 5 Drawing Sheets

NETWORK ACCESS DEVICE WITH RESTRICTED AND UNRESTRICTED INPUT PORTS

BACKGROUND OF THE INVENTION

Substantial changes have occurred in the data processing and computing industry over approximately the past decade. These changes have been driven, in part, by the increasing dominance of networking in general, and of the Internet in particular. In the past many computers were standalone, but today the capabilities and usefulness of many digital devices are substantially enhanced by being interconnected with other digital devices. Packet networks often convey information among computers, even those physically separated by vast distances.

When all is working well, networking provides substantial benefits over computers and other digital devices operating alone. However, networks are themselves vulnerable both to accidental malfunctions and to malicious attacks. Further, networks often expose to a wider audience the vulnerabilities of the digital devices attached to the network. Still further, networks often convey the consequences of a malfunction or attack far beyond the digital device or devices that are the root of the problem. Thus, security and reliability of networks is of the utmost importance.

One known approach to this problem is an access control list (ACL). An access control list stores in a memory a restricted pattern, compares this pattern to the packets traveling across a particular point in a network, and drops any packets that are restricted, that is, that match the restricted pattern. Thus, any problems that would have been created by the restricted packet being received and acted upon are prevented.

Typically, restricted packets can be detected by examining the packet headers. The information required to detect a restricted packet typically includes some combination of data at the international standards organization (ISO) layer 2 (e.g. physical port), layer 3 (e.g. IP source address, IP destination address, or both), and layer 4 (e.g. protocol type, transport layer port, or both). Thus, establishing an effective set of ACLs for a network is a complex and painstaking task that depends on the exact configuration of the network, on the communication protocols used (and not used) on the network, and on the expected use and behavior of the various digital devices on the network.

Further, as the network evolves with additions, simplifications, or reconfigurations any or all of the patterns used in any or all of the ACLs may have to be modified to reflect the new configuration and expectations.

SUMMARY OF EMBODIMENTS OF THE INVENTION

Various embodiments of the invention provide systems and methods for interconnecting a restricted device and a network. In a preferred embodiment, a device for accessing the network has various input ports, with each port having an associated parameter whose value is either restricted or unrestricted.

One embodiment of the invention is an access device with input ports for receiving packets of network traffic. Each input port has a parameter indicating whether the connected digital device is restricted or unrestricted. The access device includes packet detectors that examine packets received when a particular packet detector is enabled for that input port and that determine whether the packets examined are restricted. A controller within the access device enables the packet detectors for restricted input ports and disables the packet detectors for unrestricted input ports.

In some embodiments, an exception handler within the access device handles restricted packets from restricted devices in an advantageously flexible manner. In other embodiments, the access device further includes a controller that receives a configuration command and that sets the value of the input port parameters in response to the command.

BRIEF DESCRIPTION OF THE DRAWINGS

Objects, features, and advantages of various embodiments of the invention will become apparent from the descriptions and discussions herein, when read in conjunction with the drawings. Technologies related to the invention, example embodiments of the invention, and example uses of the invention are illustrated in the following figures.

DETAILED DESCRIPTION OF EMBODIMENTS OF THE INVENTION

The descriptions, discussions and figures herein illustrate technologies related to the invention and show examples of the invention and of using the invention. Known methods, procedures, systems, circuits, or elements may be illustrated and described without giving details so as to avoid obscuring the principles of the invention. On the other hand, details of specific embodiments of the invention are described, even though such details may not apply to other embodiments of the invention.

Some descriptions and discussions herein use abstract or general terms including but not limited to receive, present, prompt, generate, yes, or no. Those skilled in the art use such terms as a convenient nomenclature for components, data, or operations within a computer, digital device, or electromechanical system. Such components, data, and operations are embodied in physical properties of actual objects including but not limited to electronic voltage, magnetic field, and optical reflectivity. Similarly, perceptive or mental terms including but not limited to compare, determine, calculate, and control may also be used to refer to such components, data, or operations, or to such physical manipulations.

Figure 1:
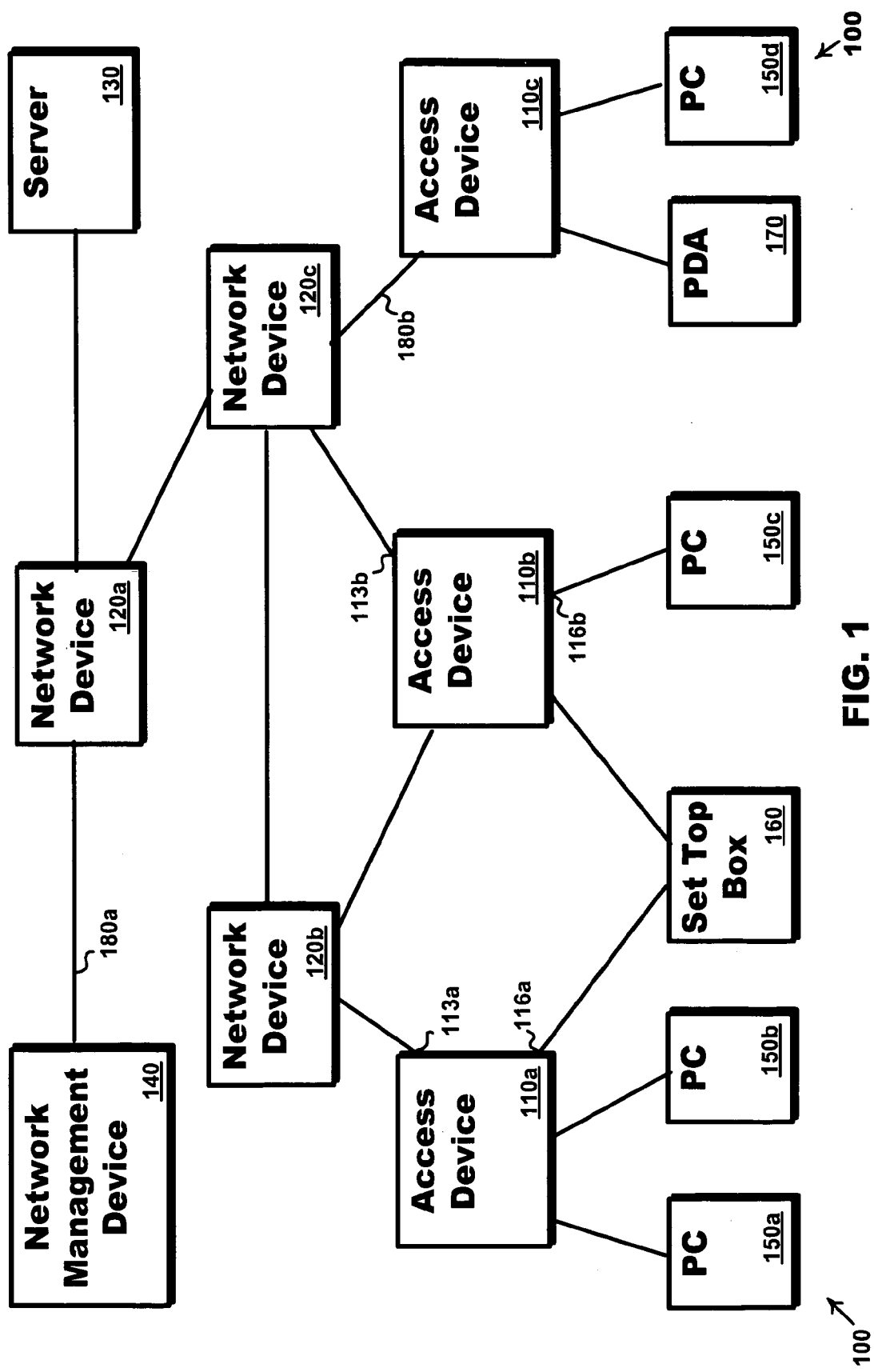
FIG. 1 shows the components and their interconnections within a network according to an embodiment of the invention.

FIG. 1 is a block diagram of a network 100, which illustrates an embodiment of the invention. In network 100, access devices 110 interconnect a number of restricted devices and a number of unrestricted devices. Restricted devices, also known as host devices, include personal computers (PCs) 150, a set top box (STB) 160, and a personal digital assistant (PDA) 170.

Unrestricted devices, also known as trusted or secured devices, include network devices 120, a server 130, and a network management device 140. Network devices 120 include, but are not limited to, switches, routers, bridges and the like. Server 130 may include, but is not limited to, a data server, a domain name system (DNS) server, or a dynamic host control protocol (DHCP) server.

Network communication links 180 interconnect the various components within network 100. For example, network communication link 180*a* interconnects network management device 140 and network device 120*a*, and link 180*b* interconnects network devices 120*c* and access device 110*c*. Links 180 may include any mixture of, but are not limited to: Ethernet links; local area network (LAN) links; virtual local area network (VLAN) links; wide area network (WAN) links; private intranet links, or links over the public Internet.

Access devices 110 have two types of interfaces. Interfaces 113 include an unrestricted input port. Interfaces 113 interconnect the access devices with the unrestricted devices within network 100, for example, interfaces 113*a* and 113*b* interconnect access devices 110*a* and 110*b*, respectively, with network device 120*b*, which may be, for example, a router in a physically secure location that is controlled by the network administrator.

Interfaces 116 include a restricted input port. Interfaces 116 interconnect access devices 110 with the restricted portions of network 100, for example, interfaces 116*a* and 116*b* interconnect set top box 160 with respectively access device 110*a* and 110*b*. Set top box 160 may, for example, be in a location that is not secured and thus vulnerable to having its network connections used maliciously.

Figure 2:
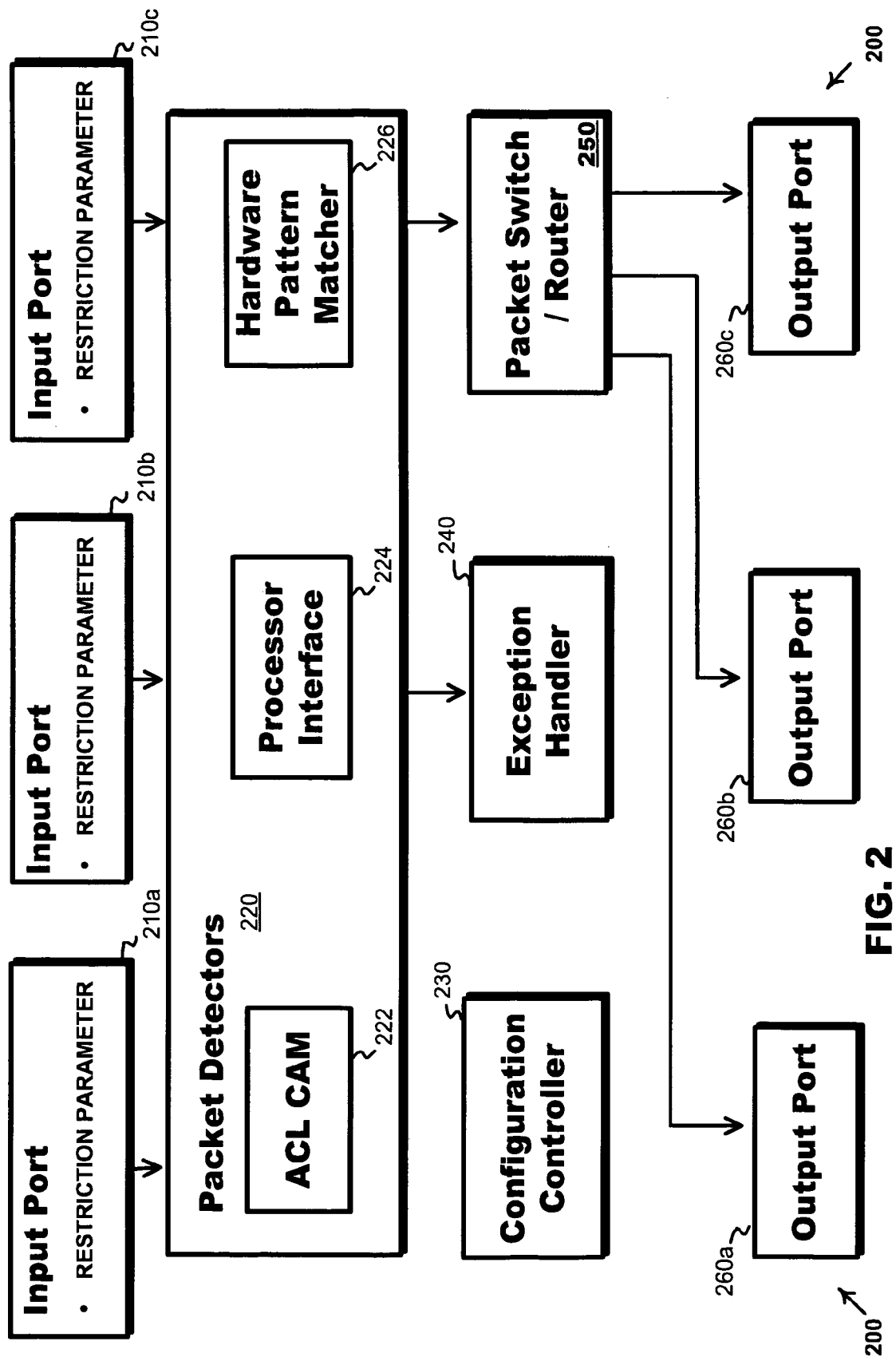
FIG. 2 shows the components and data flow within an access device according to another embodiment of the invention.

FIG. 2 is a data flow diagram of a portion 200 of an access device that illustrates an embodiment of the invention. Access device portion 200 includes input ports 210, packet detectors 200, a configuration controller 230, an exception handler 240, a packet switch/router 250, and output ports 260. Each arrow in FIG. 2 indicates that network packets flow between the components of access device 200 in the direction indicated. Configuration controller 230 is described with respect to FIG. 4 below.

Associated with each input port 210 is a restriction parameter that has the value restricted or the value unrestricted, depending on whether the device connected with that particular input port is a host device or a network device, respectively. Various embodiments of the invention define in various ways what types of devices should be restricted and what types of devices should be unrestricted. In some embodiments, network devices are connected to unrestricted ports and host devices are connected to restricted ports.

Each input port 210 receives packets of network data traffic that are transmitted from the digital device connected with that particular input port. The packets then flow to packet detectors 220. From packet detectors 220, the packets flow either to packet switch/router 250 for normal handling, or to exception handler 240 when restricted packets are received on a restricted input port.

Various embodiments of the invention include packet detectors that detect various types of restricted packets. For example, host devices do not forward packets onto other devices. Thus, it is improper when a host device attempts to participate in switching or routing protocols. Such attempts are likely due to a malicious attempt to intercept network traffic or to disrupt network capabilities.

Such switching protocols include, but are not limited to, the well known spanning tree protocol. Thus, a packet detector that detects bridge protocol data unit (BPDU) packets, as used in a spanning tree protocol, is included in some embodiments of the invention. Similarly there is no legitimate need for a host to participate in a routing protocol, including but not limited to the routing information protocol (RIP) and the interior gateway routing protocol (IGRP). BPDU packets, spanning tree protocols, the RIP protocol, and the IGRP protocol are known in the art.

Many multicast protocols include both request packets that host devices may issue and command packets that they may not issue. A host may legitimately make a request to, for example, join a particular multicast stream. A router, but not a host, may issue a command to get information on all currently available multicast streams. Such multicast protocols include, but are not limited to, the well known Internet group management (IGMP) protocol, and the well known multicast listener discovery (MLD) protocol.

Similarly, host devices may legitimately issue request packets within the well known dynamic host configuration protocol (DHCP) or the well known domain name system (DNS) protocol. However, hosts may not legitimately issue response packets in these protocols.

The above descriptions of restricted packets are not exhaustive; that is, embodiments of the invention may consider other packet types in these or other protocols to be restricted. Any set of packets may be considered restricted as long as it is possible to define a pattern that the set of packets follows. Such a pattern is called a restricted pattern.

In some embodiments of the invention, role based access control (RBAC) techniques may be used to aid the process of generating suitable descriptions of restricted patterns. RBAC may also help with updating the restricted patterns as the components of the network and their interconnections change, as the protocols supported by the network change, or as better defenses against attacks and accidents are identified. RBAC techniques are well known.

Various embodiments of the invention include packet detectors that have various designs and architectures. As shown in FIG. 2, packet detectors 220 include a content addressable memory (CAM) 222, a processor interface 224, and a hardware pattern matcher 226. When packets received are to be examined, fields within each packet, or more typically fields within the header of each packet, are extracted. One or more of packet detectors 220 examine one or more of the extracted fields.

The contents of one or more of the extracted fields are looked up within CAM 222. If the extracted fields are found via the lookup operation, then the packet matches a restricted pattern and thus the packet is restricted. If a restricted packet is received on a restricted port then the packet is not processed normally, rather the packet flows on to exception handler 240. If an unrestricted packet is received or if any packet is received on an unrestricted port then the packet flows onto packet switch/router 250 for normal processing.

In some embodiments of the invention, CAM 222 is configured to hold access parameters based on access control lists (ACLs). Access control lists stored in CAMs allow dynamic configuration of the set of restricted patterns that are to be detected; that is, changing the content of the CAM changes what patterns are restricted. A ternary CAM, that is, one where some bit positions of the pattern to match can be stored as "don't cares," can be used advantageously for storing restricted patterns for packets. ACLs, CAMs, and ternary CAMs are known in the art.

Figure 5:
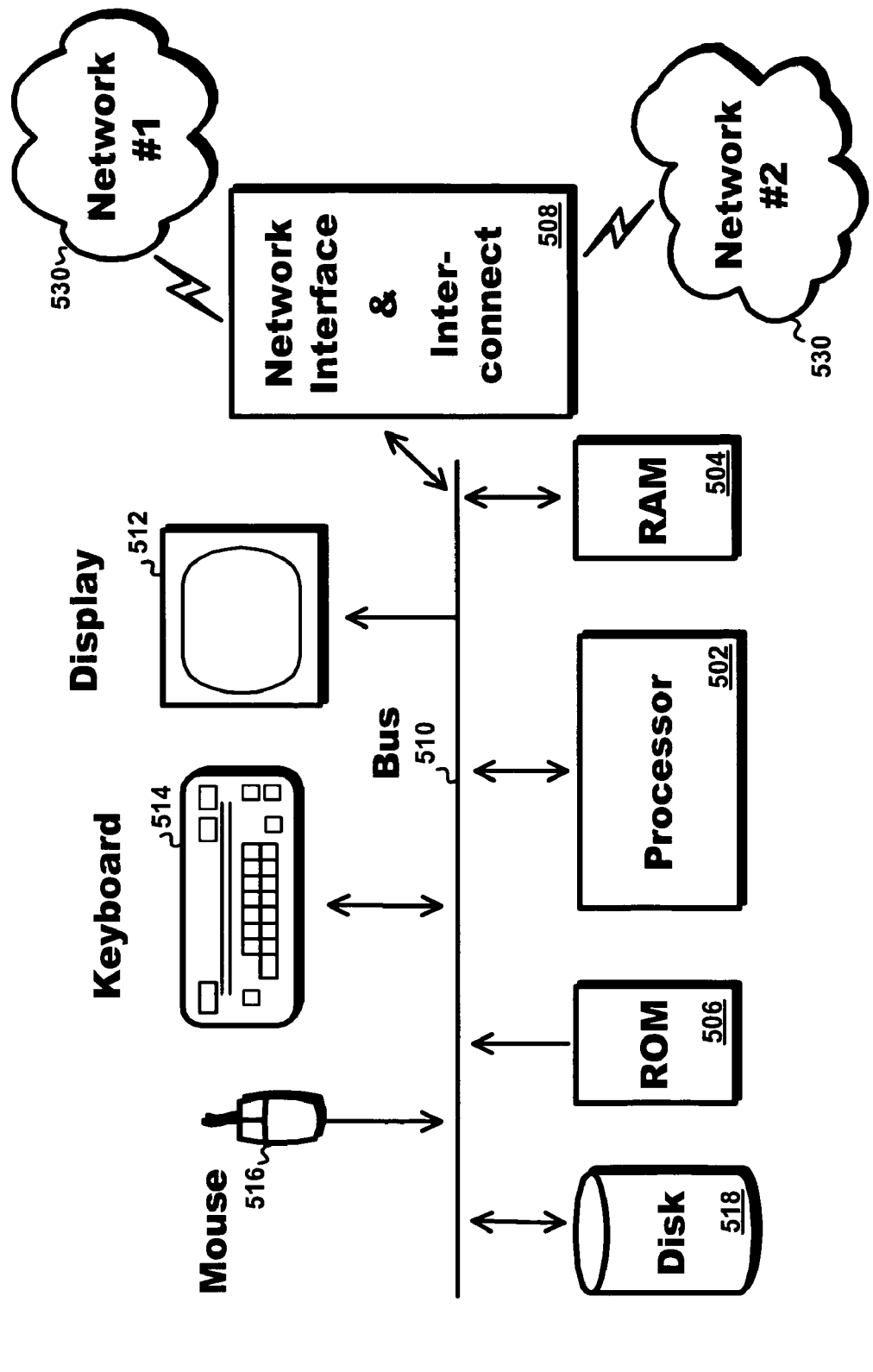
FIG. 5 shows the components and their interconnections within a digital device, including an access device according to another embodiment of the invention.

Packet detectors 220 also include a processor interface 224. Processor interface 224 determines which packets are to be handled by a processor (as shown in FIG. 5) working under the control of a firmware or software program. Some embodiments of the invention use a program to handle, for example, routing protocol packets. Such a program includes traps that are executed, instead of normal processing, when a restricted type of routing packet is received on a restricted input port. These program traps pass the packet that triggered the trap on to exception handler 240, or the traps simply handle the restricted packet within the program. Unrestricted packets, as well as all packets from unrestricted input ports, are handled normally under program control.

Packet detectors 220 also include a hardware pattern matcher 226. Hardware pattern matcher 226 is a special purpose pattern matcher that detects restricted packets that match the restricted pattern designed into or programmed into matcher 226. In a manner similar to that of ACL CAM 230, restricted packets received on a restricted input port flow on to exception handler 240. Unrestricted packets or any packet from an unrestricted port flow onto packet switch/router 250 for normal processing.

Exception handler 240 takes the appropriate action when a restricted packet is received on a restricted input port. These actions include, but are not limited to, one or more of the following: dropping the packet; generating a log message; generating a message according to a network management protocol such as the simple network management protocol (SNMP); generating an e-mail message; generating a security alarm; disabling the input port on which the restricted packet is received; or limiting a rate of packets on the input port on which the restricted packet is received. Typically, each suspect packet is dropped and one other action from the above list is taken.

Nevertheless, there are situations in which network integrity can be maintained by allowing suspect packets to go through, but only at a limited rate. For example, some routing protocol command packets may result in a substantial amount of network traffic, a substantial amount of router processing, or both. When such packets are issued by an attacker at a high rate, legitimate network traffic and processing may be denied sufficient bandwidth to function properly. Such a denial of service attack is rendered ineffective if the access device only allows such packets to go through at a sufficiently low rate, and drops only such packets when received in excess of that rate.

Packet switch/router 250 determines the output port or ports 260 to which the packet is sent. Switching and routing are known in the art.

Each output port 260 transmits packets over the network communication link associated with that particular output port. Typically, but not necessarily, each communication link supports bi-directional communication between the access device and a digital device, so that one input port and one output port are associated with each communication link and thus with each digital device.

The distinction between the restricted input ports of interfaces 116 connected to host devices and the unrestricted input ports of interfaces 113 connected to secure devices advantageously enhances the security and reliability of network 100. Security and reliability is further enhanced by associating the restriction parameter with each physical input port of the access device, i.e. by having the restriction mechanisms enabled and disabled at layer 2 of the ISO hierarchy.

Further, the simplicity and abstract or high level nature of the input port parameter (i.e. each port is either restricted or unrestricted) allows the security of network 100 to be configured easily, and easily reconfigured as the network configuration is altered. Still further, as new protocols are introduced, the packet detectors used can be reconfigured, modified, enhanced, or augmented without the need to alter the network configuration as specified in the restriction parameters. Similarly, as better defenses against attacks and malfunctions are identified, only the packet detectors need to be updated, not the restriction parameters.

Figure 3:
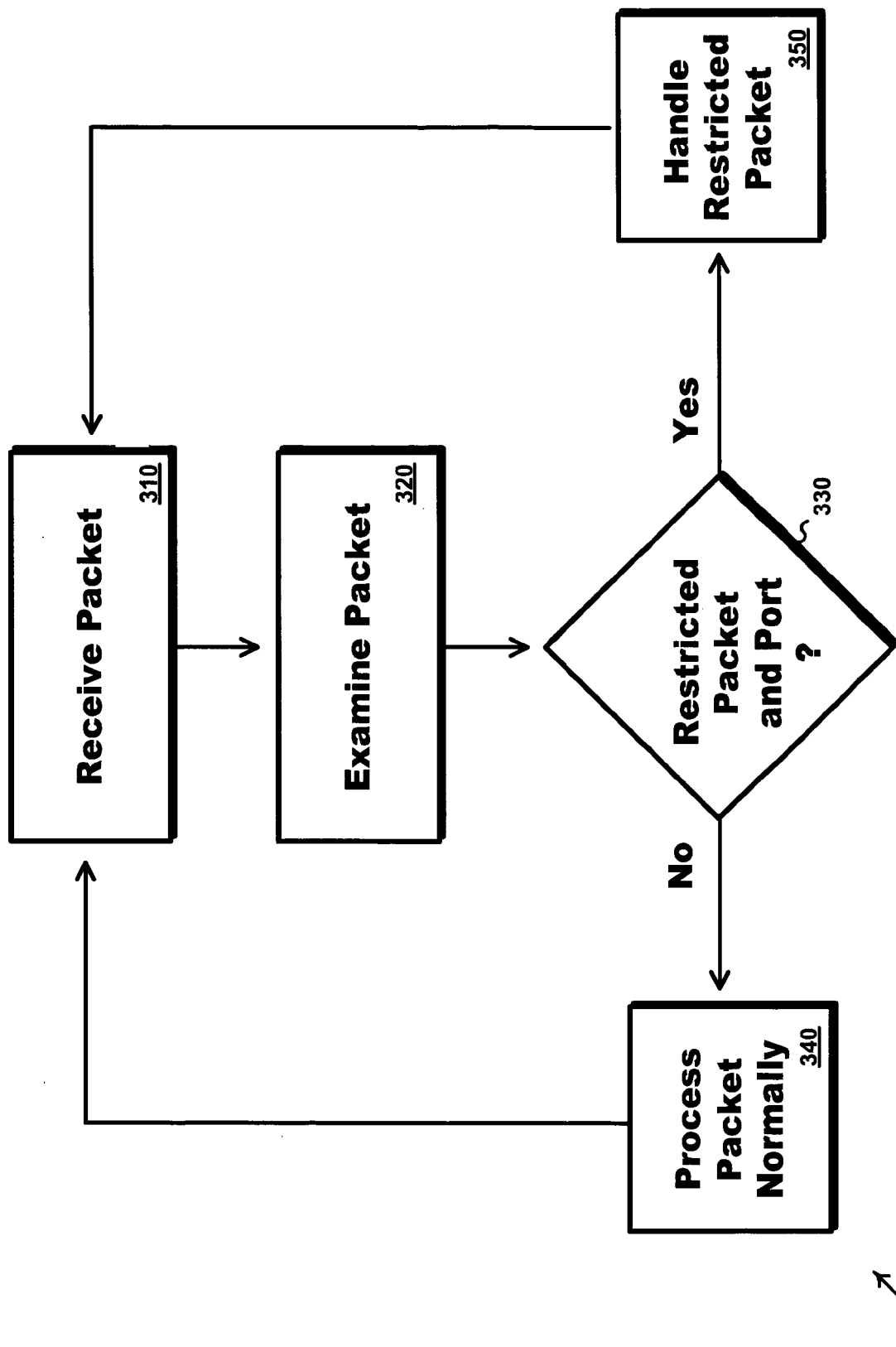
FIG. 3 shows the activities that occur when a packet is received by an access device according to yet another embodiment of the invention.

FIG. 3 is a flow chart of a process 300, which describes the operation of an access device according to an embodiment of the invention. Process 300 is ongoing and has no predefined end point.

In activity 310, an input port 210 receives a packet of network traffic. Next in activity 320, the packet received is passed to packet detectors 220. Each packet detector 220 examines the packet to determine if it is restricted, that is, if it matches a restricted pattern. Input ports 210 and packet detectors 220 are described with respect to FIG. 2.

Next, activity 330 determines whether or not a restricted packet has been received on a restricted port. If so, activity 350 occurs next. Otherwise, activity 340 occurs next, in which the packet is processed normally. Activity 350 handles the restricted packet as an exception. Activity 350 is described with respect to exception handler 240 of FIG. 2.

Some embodiments of the invention use an alternative to process 300, in which activities 320 and 330 occur only for those packets received on a restricted input port. Packets received on an unrestricted port pass directly from activity 310 to activity 340. This embodiment may be more efficient than process 300 when implemented via a program, or less efficient than process 300 when implemented in hardware.

After either activity 340 or 350, activity 310 occurs repeatedly each time another packet is received on an input port 210 of the access device.

Figure 4:
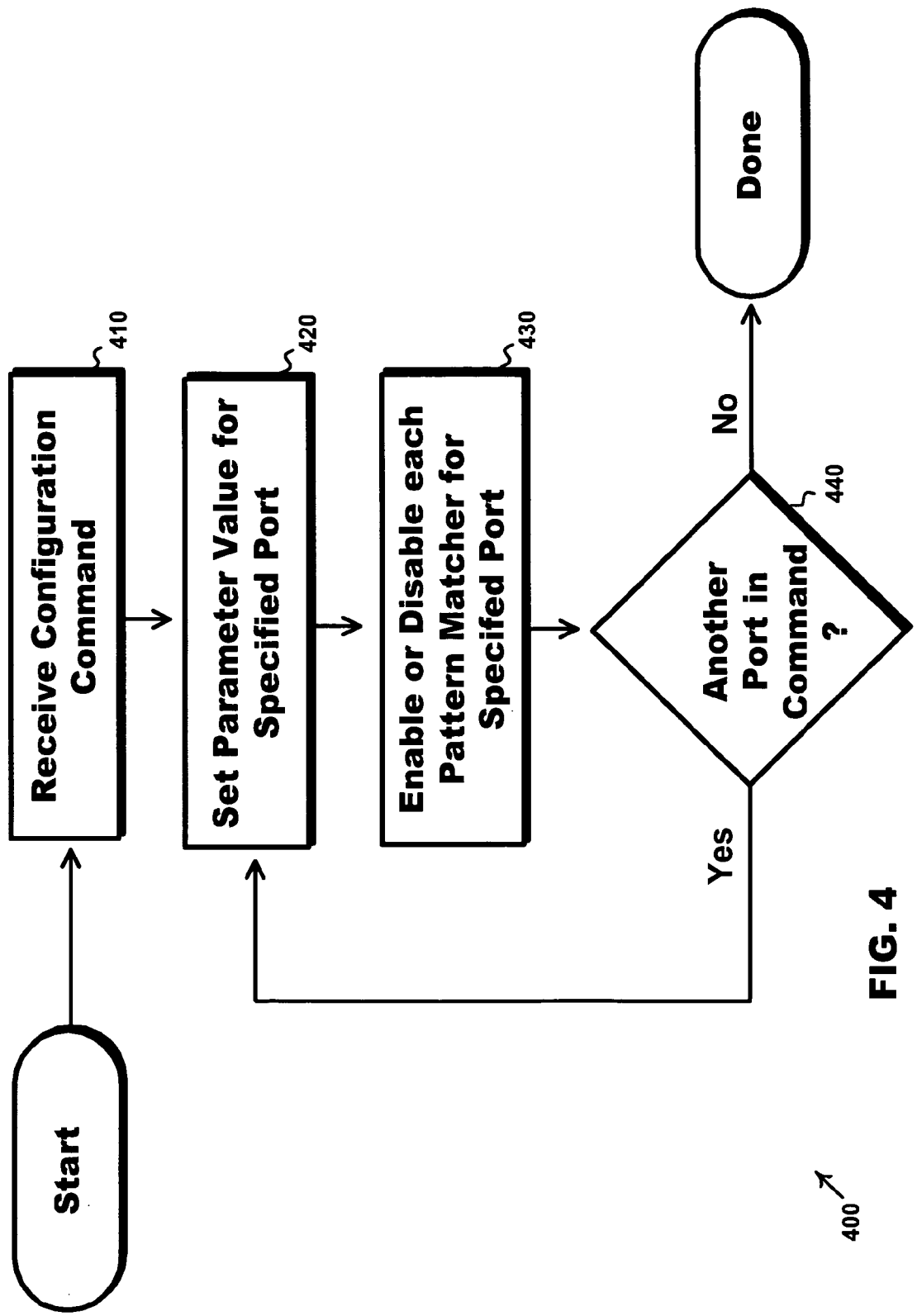
FIG. 4 shows the activities that occur when a configuration command is received by an access device according to an embodiment of the invention.

FIG. 4 is a flow chart of a process 400 according to an embodiment of the invention. In process 400, a configuration command is received and processed. Process 400 occurs in a configuration controller 230 within an access device, as described with respect to FIG. 2.

Process 400 starts with activity 410, in which a configuration command is received. Such a command may be received in various ways, including but not limited to: by receiving a simple network management protocol (SNMP) packet; or by a user such as a network administrator entering a configuration command into a command line interface (CLI) window linked to the access device. The SNMP packet or the CLI command may, but need not, originate from network management device 140, as described with regard to FIG. 1.

The configuration command received specifies, at a minimum, a particular value of the restriction parameter (i.e., either restricted or unrestricted) for a particular input port of the access device. In various embodiments of the invention, a single command may specify multiple input ports and the value, or the set of respective values, to which each port's parameter is to be set.

The configuration commands supported by various embodiments of the invention provide simple, abstract, easy to use, and flexible mechanisms for network configuration. In particular, they substantially help the network administrator with the challenging task of ensuring the security and reliability of the network. Practical networks are often in a state of flux, as new network devices and hosts are added, current devices are moved or removed, and network links are added, replaced, or restructured. Such network reconfigurations are also advantageously facilitated by the invention's ease of use.

After activity 410, activity 420 occurs, in which the parameter value specified in the command is stored for one of the input ports specified in the configuration command received. Next, activity 430 occurs. If the value specified in the command for the current input port is restricted, then each pattern matcher within the access device is enabled for packets arriving on that port. If the value specified is unrestricted, then each pattern matcher within the access device is disabled for packets arriving on that port.

In some embodiments of the invention, a configuration command may specify which action or actions are to be taken when a restricted packet is received on a restricted input port. In such embodiments, activity 430 includes configuring and initializing these actions.

After activity 430, activity 440 occurs in which control returns to activity 420 if there is another input port specified in the configuration command received. Process 400 ends when activity 440 determines that all of the input ports specified in the configuration command received have been configured as specified.

FIG. 5 is a block diagram of a digital device 500. Various embodiments of the invention may use device 500 in various ways. Device 500, or a variant thereon, may be used as an access device, a network device, a host, a network management device, a server, or the like.

Digital device 500 includes one or more buses 510 configured to communicate information, such as addresses, operation codes, or data. The device also comprises one or more processors 502 configured to process information and data according to instructions and other data. The processor may be, but is not limited to: a central processing unit; a microprocessor; an embedded processor; or a special purpose processor.

Digital device 500 may optionally include RAM 504, that is, one or more volatile memory units, devices or circuits configured to store information, data or instructions. RAM 504 may be but is not limited to random access memory (RAM), static RAM, or dynamic RAM. RAM 504 is coupled to bus 510.

Digital device 500 may optionally include ROM 506, that is, one or more non-volatile memory units or other devices or circuits configured to store static information and instructions. ROM 506 may include, but is not limited to one or more of: read only memory (ROM); programmable ROM; flash memory; electrically programmable ROM (EPROM); or erasable electrically programmable ROM (EEPROM). ROM 506 is coupled with bus 510.

Digital device 500 may optionally include network interface and interconnect 508, that is, one or more devices or circuits configured to interface with one or more other electronic devices via one or more networks 530. Network interface and interconnect 508 is coupled to bus 510. Network interface and interconnect 508 may optionally perform one or more of switching, routing, bridging, or relay functions among networks 530. Networks 530 may include, but are not limited to one or more of: Internet protocol (IP) networks; asynchronous transfer mode (ATM) networks; frame relay networks; time division multiplexing (TDM) networks; or the public switched telephone network (PSTN).

Digital device 500 may optionally include keyboard 514, that is, one or more alphanumeric input devices configured to communicate information and command selections from a user. Keyboard 514 may, for example, have alphabetic, numeric, function and control keys, buttons, selectors or touch-sensitive screens. The keyboard is coupled to bus 510. Alternatively or additionally, the functions of keyboard 514 may be directed or activated via input from mouse 516 using special menus, click sequences, or commands.

Digital device 500 may optionally include mouse 516, that is, one or more cursor control, indicating, selecting, pointing, or control devices configured to communicate analog, quantitative or selection user input information and command selections to processor 502. Mouse 516 may include, but is not limited to one or more of: a mouse; a track ball; a touch pad; an optical tracking device; a joystick; a game controller; a touch screen; or a glove. The mouse is coupled to bus 510. Alternatively or additionally, the functions of mouse 516 may be directed or activated via input from keyboard 514 using special keys, key sequences or commands.

Digital device 500 may optionally include disk 518, that is, one or more devices or circuits configured to store information, data or instructions. Disk 518 may include, but is not limited to one or more of: a mass storage device; a magnetic disk; an optical disk; a compact disk (CD); a writeable CD; a digital versatile disk (DVD); a hard disk; a floppy disk; a flash memory; or a memory stick. Disk 518 is coupled to bus 510.

Digital device 500 may optionally include display 512, that is, one or more devices or circuits configured to display pictures, video, text, or graphics. Display 512 may include, but is not limited to one or more of: a cathode ray tube (CRT); a flat panel display; a liquid crystal display (LCD); a field emission display (FED); or a heads up display suitable for use in a vehicle. Display 512 is coupled to bus 510.

Although the invention has been described with respect to specific embodiments thereof, these embodiments are merely illustrative, and not restrictive of the invention. For example, network 100, and devices 200, and 500, as shown in FIGS. 1, 2, and 5 are only illustrative. The invention may be embodied in network systems and devices with more or fewer components, other types of components, or other interconnection schemes. Further, processes 300, and 400 are only illustrative examples. The invention may be embodied in network processes with more or fewer activities, other types of activities, and other control flows or concurrencies among the activities.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer-readable medium can be, by way of example only but not by limitation, a semiconductor system, apparatus, system, device, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. An access device for interconnecting a restricted device and a network, the access device comprising:
   a plurality of input ports, wherein each input port is configured to receive packets of network traffic, each input port being adapted for connection to a corresponding digital device;
   memory associated with the access device, the memory including: for each input port, a parameter programmed in the access device, the parameter having a value that indicates whether a digital device that is connected to the input port associated with the parameter is to be treated as restricted or unrestricted, the value of the parameter being configurable by a user of the access device such that the input port may be restricted or unrestricted based on the value of the parameter configured by the user; and
   for each input port, a packet detector that is configured by the user using a controller to:
      examine packets received on the input port;
      determine whether the examined packets are restricted, wherein the packet detector examines a packet received on the input port by extracting one or more fields from a header of the received packet and comparing the extracted fields to restriction patterns stored in a memory in the packet detector, the restriction patterns being modifiable by a user of the access device, wherein determining that a received packet is restricted is based on a match between the extracted fields and a restriction pattern;
      based on a determination that the received packet is restricted, examine the value of the parameter associated with the input port to determine whether the input port is restricted or unrestricted, wherein the packet detector routes the received packet to an exception handler upon determining that the input port is restricted, and routes the received packet to a routing engine separate and distinct from the exception handler upon determining that the input port is not restricted; and
      based on a determination that the received packet is not restricted, route the received packet to the routing engine.

2. The access device of claim 1, wherein the exception handler is configured to handle a received packet that is restricted, wherein the exception handler is configured to take at least one action selected from a group including the following: dropping the packet; generating a log message; generating a message according to a simple network management protocol (SNMP); generating an e-mail message; generating a security alarm; disabling the input port on which the restricted packet is received; and limiting a rate of packets on the input port on which the restricted packet is received.

3. The access device of claim 1, wherein the controller is further configured to receive a single configuration command and to set the value of the parameter for each input port that is specified in the single configuration command to a particular value in response to the single configuration command.

4. The access device of claim 1, wherein at least one packet detector includes a processor programmed to execute a trap when processing packets that are restricted.

5. The access device of claim 1, wherein the memory in at least one packet detector includes content addressable memory (CAM).

6. The access device of claim 5, wherein the CAM comprises a ternary CAM (TCAM).

7. The access device of claim 1, where at least one packet detector is configured to detect restricted packets within a protocol selected from: a spanning tree protocol; a routing protocol; a routing information protocol (RIP); a gateway routing protocol (IGRP); a multicast protocol; an Internet group management (IGMP) protocol; a multicast listener discovery (MLD) protocol; a dynamic host configuration (DHCP) protocol; and a domain name system (DNS) protocol.

8. A method of interconnecting a restricted device and a network, the method comprising:
   storing a parameter that is programmed for each input port of a plurality of input ports, wherein each input port is adapted for connection to a corresponding digital device, and wherein a value of the parameter indicates whether the digital device that is connected to the input port associated with the parameter is to be treated as restricted or unrestricted, the value of the parameter being configurable by a user such that the input port may be restricted or unrestricted based on the value of the parameter configured by the user;
   receiving packets of network traffic on the plurality of input ports;
   for each input port that is receiving packets of network traffic, examining received packets to determine whether the received packets are restricted;
   responsive to determining that a received packet is restricted:
      examining the value of the parameter associated with the input port to determine whether the input port is restricted or unrestricted,
      routing the received packet to an exception handler upon determining that the input port is restricted, and
      routing the received packet to a routing engine separate and distinct from the exception handler upon determining that the input port is not restricted; and
   responsive to determining that the received packet is not restricted, routing the received packet to the routing engine.

9. The method of claim 8, further comprising:
   handling the restricted packets by performing at least one action selected from a group including the following: dropping the packet; generating a log message; generating a message according to a simple network management protocol (SNMP); generating an e-mail message; generating a security alarm; disabling the input port on which the restricted packet is received; and limiting a rate of packets on the input port on which the restricted packet is received.

10. The method of claim 8, wherein examining received packets includes processing packets according to a program and executing a trap when the packets are restricted.

11. The method of claim 8, wherein the parameters are stored in a content addressable memory (CAM) comprises a ternary CAM (TCAM).

12. The method of claim 8, wherein determining that a received packet is restricted includes identifying restricted packets within a protocol selected from at least one of: a spanning tree protocol; a routing protocol; a routing information protocol (RIP); a gateway routing protocol (IGRP); a multicast protocol; an Internet group management (IGMP) protocol; a multicast listener discovery (MLD) protocol; a dynamic host configuration (DHCP) protocol; and a domain name system (DNS) protocol.

13. A non-transitory computer-readable storage medium containing instructions for execution by a processor, the instructions when executed by the processor cause the processor to perform operations including:
   storing, using a storage medium, a parameter that is programmed for each input port of a plurality of input ports, wherein each input port is adapted for connection to a corresponding digital device, and wherein a value of the parameter indicates whether the digital device that is connected to the input port associated with the parameter is to be treated as restricted or unrestricted, the value of the parameter being configurable by a user such that the input port may be restricted or unrestricted based on the value of the parameter configured by the user;
   receiving packets of network traffic on the plurality of input ports;
   for each input port that is receiving packets of network traffic, examining received packets to determine whether the received packets are restricted;
   responsive to determining that a received packet is restricted:
      examining the value of the parameter associated with the input port to determine whether the input port is restricted or unrestricted,
      routing, the received packet to an exception handler upon determining that the input port is restricted, and
      routing the received packet to a routing engine separate and distinct from the exception handler upon determining that the input port is not restricted; and
   responsive to determining that the received packet is not restricted, routing the received packet to the routing engine.

14. The computer-readable medium of claim 13, wherein the processor is further caused to perform:
   handling the restricted packets, where the handling includes performing at least one action selected from the following: dropping the packet; generating a log message; generating a message according to a simple network management protocol (SNMP); generating an e-mail message; generating a security alarm; disabling the input port on which the restricted packet is received; and limiting a rate of packets on the input port on which the restricted packet is received.

15. The computer-readable medium of claim 13, wherein examining received packets includes processing packets according to a program and executing a trap when the packets are restricted.

16. The computer-readable medium of claim 13, wherein determining that a received packet is restricted includes identifying restricted packets within a protocol selected from at least one of: a spanning tree protocol; a routing protocol; a routing information protocol (RIP); a gateway routing protocol (IGRP); a multicast protocol; an Internet group management (IGMP) protocol; a multicast listener discovery (MLD) protocol; a dynamic host configuration (DHCP) protocol; and a domain name system (DNS) protocol.

17. An access device for interconnecting a restricted device and a network, the access device comprising:
a plurality of input ports, wherein each input port is configured to receive packets of network traffic, each input port being adapted for connection to a corresponding digital device;
means for receiving packets of network traffic from a digital device that is connected to an input port;
memory associated with the access device, the memory including, for each input port, a parameter programmed in the access device, the parameter having a value that indicates whether the digital device that is connected to the input port associated with the parameter is to be treated as restricted or unrestricted, the value of the parameter being configurable by a user of the access device such that the input port may be restricted or unrestricted based on the value of the parameter configured by the user; and
for each input port, a packet detector that is configured to:
examine packets received via the input port;
determine whether the packets are restricted, wherein the packet detector examines a packet received on the input port by extracting one or more fields from a header of the received packet and comparing the extracted fields to a restriction pattern stored in a memory in the access device, wherein determining that a received packet is restricted based on a match between the extracted fields and a restriction pattern;
when the received packet is restricted:
examine the value of the parameter associated with the input port to determine whether the input port is restricted or unrestricted,
route the received packet to an exception handler upon determining that the input port is restricted, and
route the received packet to a routing engine separate and distinct from the exception handler upon determining that the input port is not restricted; and
when the received packet is not restricted, route the received packet to the routing engine without examining the value of the parameter associated with the input port.

18. The access device of claim 17, further comprising:
means for handling the restricted packets from the restricted devices by performing at least one action selected from the following: dropping the packet; generating a log message; generating a message according to a simple network management protocol (SNMP); generating an e-mail message; generating a security alarm; disabling an input port on which a restricted packet is received; and limiting a rate of packets on the input port via which the restricted packet is received.

19. The access device of claim 17, wherein at least one packet detector further comprises means for receiving a single configuration command and for setting the value of the parameter for a particular input port that is specified in the single configuration command to a particular value in response to the single configuration command.

20. The access device of claim 17, wherein at least one packet detector further comprises means for processing packets according to a program that includes a trap for packets that are restricted.

21. The access device of claim 17, wherein at least one packet detector further comprises means for holding the restricted patterns in the memory and for looking up the packets in the restricted patterns.

* * * * *